Patented Feb. 3, 1948

2,435,552

UNITED STATES PATENT OFFICE 2,435,552

ADDITION PRODUCTS OF ACRYLONITRILE AND ARYL SULFONES AND PROCESS FOR PREPARING SAME

Herman A. Bruson, Rydal, Pa., assignor to The Resinous Products & Chemical Company, Philadelphia, Pa., a corporation of Delaware No Drawing. Application May 4, 1945,
Serial No. 592,058

2 Claims. (Cl. 260—465)

This invention concerns addition products of acrylonitrile and aryl sulfones having an —SO$_2$— group joined to two carbon atoms, one of which forms part of an aryl nucleus and the other of which carries at least one hydrogen atom and is bound to another carbon atom which is bound to a further substituent by a multiple bond.

These addition products are prepared by reacting in the presence of an alkaline condensing agent acrylonitrile and a sulfone of the formula

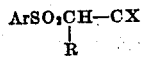

wherein Ar is an aryl nucleus, R is hydrogen or a hydrocarbon group, and X is a substituent multiply bonded to the adjacent carbon atom. By this reaction the carbon atom in juxtaposition to the sulfonyl group is cyanoethylated. When R is hydrogen, one or both of the hydrogen atoms of the methylene group in juxtaposition to the sulfonyl group may be replaced by the β-cyanoethyl group. There are thus formed compounds of the formulae

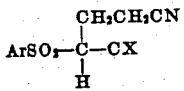

and

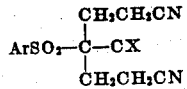

For effecting the addition reaction, there may be used any of the oxides, hydroxides, amides, hydrides, or alcoholates of the alkali metals or the alkali metals themselves or strongly basic quaternary ammonium hydroxides. Typical of these condensing agents are sodium or potassium oxide, sodium hydroxide, lithium hydroxide, potassium hydroxide, sodium amide, potassium hydride, sodium methylate, potassium ethylate, benzyl trimethyl ammonium hydroxide, dibenzyl dimethyl ammonium hydroxide, or the like. Only relatively small amounts of such condensing agents are required, about 1% to about 20% of the weight of the sulfone usually being entirely adequate.

If desired, the reaction may be carried out in the presence of an inert organic solvent or one which is less reactive with the acrylonitrile than the reacting sulfone. Typical of such solvents which serve as suspending media, diluents, or actual solvents for the reactants and catalysts are benzene, toluene, dioxane, and tertiary butyl alcohol.

There may be used a polymerization inhibitor, such as hydroquinone, naphthylamine, etc.

The aryl sulfones which contain an active methenyl or methylene group contiguous to the sulfone group may have nuclear substituents in the aryl nucleus, such as halogens, nitro groups, alkoxy groups, acyl groups, alkyl groups, other aryl substituents, etc. The methenyl or methylene group may be attached to residues of esters, amides, nitriles, unsaturated hydrocarbons, or other groups which carry multiple linkages. Typical sulfones are phenyl allyl sulfone, phenyl sulfonyl acetamide, phenyl sulfonyl acetonitrile, ethyl phenyl sulfonyl acetate, butyl phenyl sulfonyl acetate, phenyl benzyl sulfone, chlorophenyl benzyl sulfone, phenyl diphenylmethyl sulfone, phenyl methyl (phenyl) methyl sulfone, naphthyl benzyl sulfone, naphthyl allyl sulfone, phenyl methallyl sulfone, etc.

The reaction of such a sulfone and acrylonitrile in the presence of an alkaline condensing agent may be effected at temperatures from about 25° to about 75° C. or even at a somewhat higher temperature to complete the reaction. Since the addition reaction is usually exothermic, it is generally desirable to control the resulting rise in temperature by external cooling, rate of mixing, or other conventional means. Reacting proportions of acrylonitrile and of sulfone may be used or an excess of either reactant, with the exception that when a mono-β-cyanoethylated product is desired from a sulfone having a methylene group, it is, of course, necessary to limit the proportion of acrylonitrile. Even then, both mono- and di-cyanoethylated products result. When the reaction has been carried to the desired stage, it is advisable to destroy or remove the alkaline catalyst by neutralizing it, extracting it, or otherwise dealing with it. The reaction product may then be readily worked up.

The invention is illustrated by the following examples of typical preparations of β-cyanoethylated sulfones.

*Example 1*

To a stirred solution of 5.8 parts of phenyl benzyl sulfone, C$_6$H$_5$—SO$_2$—CH$_2$C$_6$H$_5$, 40 parts of acetonitrile, and 0.5 part of aqueous 40% trimethyl benzyl ammonium hydroxide, there was added gradually 2.7 parts of acrylonitrile while the reaction mixture was maintained at 32°–38° C. by occasional cooling. The mixture was then stirred for eighteen hours at room temperature and neutralized with dilute hydrochloric acid. The product was washed with water and dried.

The residue (five parts) was a thick oil which crystallized when mixed with ethanol. After recrystallization from ethanol, the product formed colorless crystals melting at 180° C. and having the formula

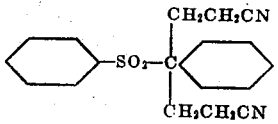

Upon analysis, the product was found to contain 67.80% of carbon, 5.53% of hydrogen, 8.26% of nitrogen, and 9.25% of sulphur as compared to calculated values of 67.45%, 5.32%, 8.29%, and 9.47%, respectively.

*Example 2*

To a stirred solution of 19.6 parts of p-methylphenyl allyl sulfone, $$CH_3—C_6H_5—SO_2—CH_2—CH=CH_2,$$

50 parts of tertiary butyl alcohol, and three parts of aqueous 40% trimethyl benzyl ammonium hydroxide, there was gradually added 10.6 parts of acrylonitrile while the reaction mixture was cooled and maintained at 35°–40° C. The mixture was stirred for two hours after the addition was completed. It was then faintly acidified with dilute hydrochloric acid and dissolved in an equal volume of ethylene dichloride. This solution was then washed with water and the ethylene dichloride removed by evaporation. The residue was dried at 100° C. under a reduced pressure of 0.5 mm. The product obtained was a thick oil containing 8.8% of nitrogen by analysis, corresponding to a mixture of about 13% of the monocyanoethylated sulfone

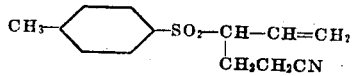

and about 87% of the dicyanoethylated product

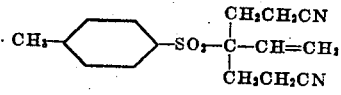

*Example 3*

To a stirred solution of 24.2 parts of the ethyl ester of p-methylphenyl sulfonyl acetic acid, $$CH_3—C_6H_5—SO_2—CH_2COO—C_2H_5,$$

50 parts of tert.-butyl alcohol, and two parts of methanolic 30% potassium hydroxide solution, there was gradually added 10.6 parts of acrylonitrile at 30°–40° C. The mixture was stirred for several hours longer. It was then poured into 500 parts of water, made slightly acid with dilute sulfuric acid, and allowed to stand overnight. The oil which separated crystallized out as a white solid. After recrystallization from ethanol, it formed colorless crystals melting at 100°–106° C. The analysis indicated the product to have the formula:

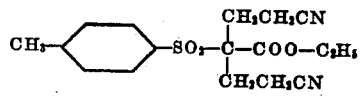

In place of the ethyl ester of the above phenyl sulfonyl acetic acid, there may be used other esters, the nature of the alcohol residue used in place of the ethyl group not having any particular influence on the course of the addition reaction. Thus, there may be used another alkyl ester such as methyl, butyl, isobutyl, hexyl, octyl, dodecyl, or stearyl, an unsaturated aliphatic group such as methallyl, undecenyl, or oleyl, an aralkyl group such as benzyl, a cycloaliphatic group such as cyclohexyl, or a heterocyclic group such as tetrahydrofurfuryl, etc.

The cyanoethylated sulfones are useful as intermediates for the preparation of resins, plastics, pharmaceuticals, and insecticides.

I claim:

1. An addition product of acrylonitrile and phenyl benzyl sulfone having the formula

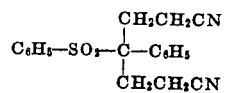

2. As new chemical substances, compounds of the formula

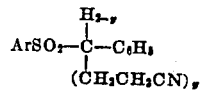

wherein Ar is an aryl nucleus of the benzene and naphthalene series and $y$ is an integer having a value from one to two.

HERMAN A. BRUSON.

REFERENCES CITED

The following references are of record in the file of this patent:

UNITED STATES PATENTS

| Number | Name | Date |
|---|---|---|
| 2,305,529 | Hester et al. | Dec. 15, 1942 |
| 2,349,405 | Bruson et al. | May 23, 1944 |

OTHER REFERENCES

Ser. No. 374,864, Wiest et al. (A. P. C.), pub. June 15, 1943.

Ser. No. 377,664, Wiest et al. (A. P. C.), pub. April 20, 1943.